United States Patent Office 3,166,426
Patented Jan. 19, 1965

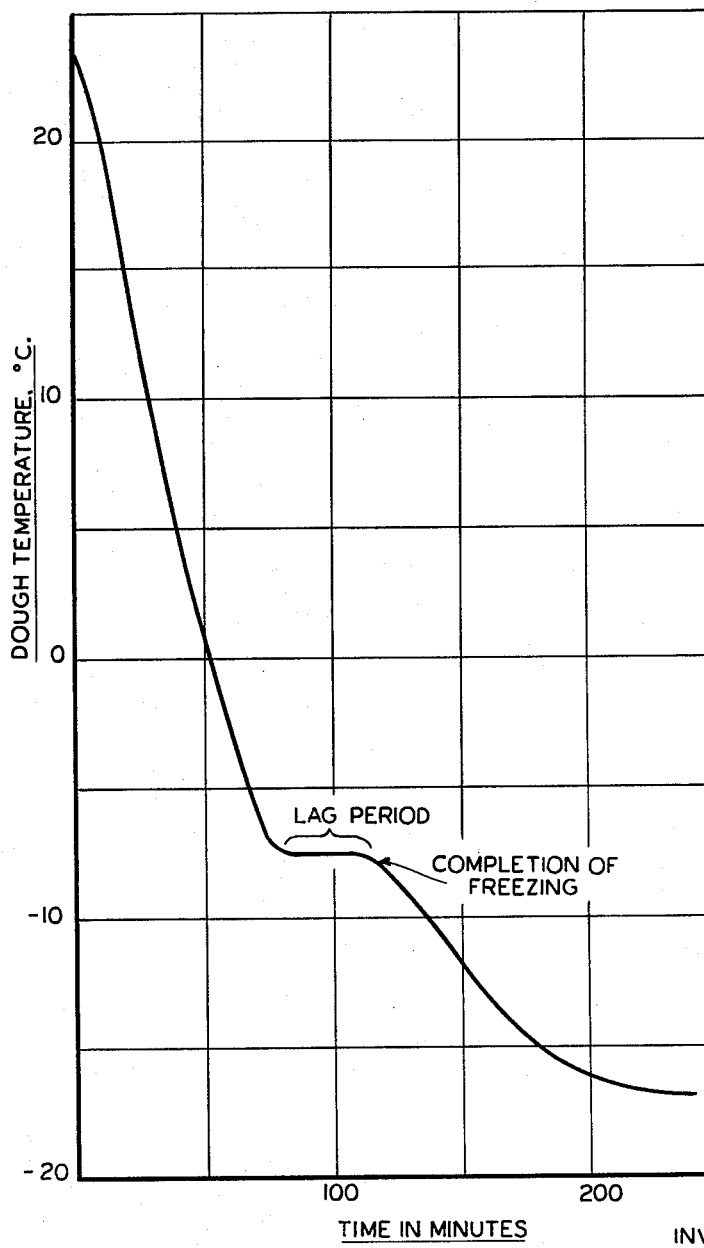

3,166,426
METHOD OF PRESERVING CANNED REFRIGERATOR DOUGHS
Samuel A. Matz, Liverpool, Ernest G. Linke, North Syracuse, and Donald E. Mook, De Witt, N.Y., assignors to The Borden Company, New York, N.Y., a corporation of New Jersey
Filed Feb. 9, 1962, Ser. No. 172,226
3 Claims. (Cl. 99—192)

This invention relates to a preleavened dough ready for baking in making rolls, biscuits, pastry, or the like bakery products. The invention has particular reference to canned refrigerated chemically leavened doughs and will be described in connection therewith.

In such commercial refrigerated dough practice, there is ordinarily used, as the leavening agent or gas generating component, a slowly acting sodium pyrophosphate of the approximate formula $Na_2H_2P_2O_7$ in combination with sodium bicarbonate. All ingredients are mixed, the resulting dough rolled out, the dough then sheeted and cut into blanks such as discs about 1.5–2 inches in diameter by 1/4–5/8 inch thick. The cut-outs are dusted with rice flour or oiled to prevent sticking together. They are then stacked and packed in a suitable can. These cans are dough tight but not gas-tight. As a result, air and carbon dioxide may and do escape so that the dough reaches and blocks the gas outlets. Within about 1.5–3 hours after the package is sealed, for instance, the biscuits will have so expanded as to fill the container and close the original vents for gas and the internal pressure of carbon dioxide generated by the leavening materials will have risen to around 8–16 p.s.i. Pressure within the can will be maintained over a period of 8 weeks or so if the biscuit dough and cans are normal and the storage temperature is between 40° and 50° F.

All of the equipment including containers herein referred to are conventional and are not illustrated.

One of the difficulties in the manufacture of doughs using phosphate leavening agents has been the formation of visible phosphate crystals (disodium phosphate dodecahydrate). This crystal formation is accelerated at storage temperatures between 40° and 50° F., being most abundant at about 45° F. This crystallization is prevalent in the canned refrigerated doughs because of their extended storage including the normal period of transportation and shelving in the stores and homes. These visible crystals cause consumer rejection of the product because of their glass-like appearance and an uneven coloration of the baked goods which develops upon baking.

Efforts have been made to overcome this problem, as illustrated in the Erekson et al. Patent No. 2,942,988, but these have depended on formulation changes which have reduced the concentration of sodium or phosphate ions in the dough by substituting materials such as fumaric acid for part of the sodium pyrophosphate. Such methods are not entirely satisfactory and in many instances formula changes cannot be made since the specific reaction of sodium acid pyrophosphate, or other phosphate-containing leavening acid, with the bicarbonate may be required. Commercially the use of substitutes, such as fumaric acid, is not entirely satisfactory in that such substitutes are more expensive than the sodium acid pyrophosphate.

It has now been found that phosphate leavened cereal doughs can be prepared that can be kept at storage temperatures between 40° and 50° F., stored for longer periods of time, and which are free from visible phosphate crystal during the period before use without changing the formulation of the dough.

Briefly stated, the present invention comprises a dough for refrigerated storage containing microscopic disodium phosphate dodecahydrate crystals of substantially uniform size dispersed virtually uniformly throughout the dough. The present invention also includes the process described herein for making such dough.

FIG. 1 illustrates the cooling curve of a refrigerated type cereal dough.

As to materials, the flour, water, shortening, seasoning agents, and other minor ingredients employed in the dough and the proportions thereof are those conventionally used in making bakery products. Typical formulations are set forth in the examples herein and in the Erekson et al. Patent No. 2,942,988.

The chemical leavening agent used in the dough includes an active alkali bicarbonate in combination with an alkali metal phosphate, both of baking grade. Suitable bicarbonates are sodium and potassium bicarbonate. The use of sodium bicarbonate is preferred. The alkali metal phosphate used is preferably an essentially anhydrous sodium acid pyrophosphate of a particle size to pass substantially completely through a U.S. standard 30-mesh screen and usually also through a 60-mesh and at least 50% through 200-mesh. Other suitable phosphates are sodium aluminum phosphate hydrate and sodium aluminum phosphate anhydrous.

In accordance with the present invention the dough is made in the conventional manner by admixing the ingredients such as flour, shortening, flavoring, water, the usual minor ingredients, and the chemical leavening agent, and then developing and shaping the dough as desired. The dough is then placed in the container and allowed to proof at temperatures of 60°–75° F. Proofing involves the reaction of the chemical leaveners to provide sufficient carbon dioxide to cause the dough to expand and fill the container so as to close the gas vents.

The canned dough is cooled for a time sufficient to bring the dough to its freezing point. The time and temperature required to lower the dough to its freezing point will vary dependent upon can dimensions, net weight of the dough, formulation of the dough, and freezing conditions used. The necessary time can be determined by withdrawing sample cans at intervals, opening them and noting the temperature and condition of the dough. A sudden reduction in the rate at which the temperature drops will be observed when the freezing point of the dough is reached. The freezing treatment is considered to be adequate when this lag period has been completed and the dough temperature again starts to drop. FIG. 1 shows the lag point for a typical refrigerated cereal dough formulation. It is believed that the lag point, or plateau, in the freezing curve is due to the crystallization of the particular eutectic which exists in the dough. In order for the freezing to be effective it is believed that substantially all of the aqueous solution in the dough must be brought to a solid state. Once the time has been obatined for a given product on the given freezing room conditions, the same time of treatment can be used for all subsequent batches.

After the canned dough has reached the desired temperature, the cans are removed from the cooling area and transferred to the usual storage area where the temperature is maintained at 40°–50° F. Thenceforth, the cans may be transported and the dough used in the ordinary manner.

Instead of cooling the dough after proofing in the can, it may first be brought to its freezing point and then placed in the can while still in a hard condition. The can is then sealed, the dough thawed, and then proofed. The cans of dough are then transferred to a storage area kept at 40°–50° F. and subsequently handled in an ordinary manner.

While the exact theory is not understood, microscopic examination suggests a reason for the prevention of phosphate crystal formation in doughs processed according to the instant invention. Microscopic examination of refrigerated doughs made in accordance with the instant process revealed that deposits of microscopic disodium phosphate dodecahydrate crystals of substantially uniform size are formed throughout the dough when the temperature is lowered to approximately the freezing point of the dough. When the dough is not treated as described herein crystallization occurs in a more random fashion throughout the dough, forming microscopic crystals of widely varying size. In the latter case the larger crystals tend to grow at the expense of the smaller crystals during storage. In a relatively short period of time some of the larger crystals reach visible dimensions. Apparently, when a large number of uniform size crystals are provided early in the storage life of the product, as by the method of the present invention, visible crystal growth is greatly retarded.

The invention will be further illustrated by the following specific examples of the practice of it. In these examples and elsewhere herein proportions are expressed as parts by weight on the dry basis except that the flour is stated on the basis of a moisture content of 14%.

*Example 1*

A cereal dough was made of the following formula:

| | |
|---|---|
| Flour | 100 |
| Sucrose | 6.25 |
| Salt | 1.6 |
| Margarine | 6.5 |
| Non-fat milk solids | 6.0 |
| Sodium bicarbonate | 2.0 |
| Sodium acid pyrophosphate | 3.4 |
| Water | 53.5 |
| Roll-in-shortening | 35.0 |

The dough was prepared by admixing the dry ingredients, including flour, sucrose, salt, milk solids, sodium bicarbonate, and sodium acid pyrophosphate, in a standard mixing bowl used for dough development. The margarine was then blended with the dry ingredients. Finally, the required amount of water of a temperature sufficient to give a dough temperature of 55° F. was added. The dough was mixed until thoroughly developed. The roll-in shortening was then incorporated into the dough in such manner as to give a dough with a laminar structure composed of alternate layers of dough and shortening. The dough was finally sheeted out to about ½ inch thickness, and dusted with rice powder. Hexagonal pieces were cut from the dough.

The processed dough was placed in cans made to handle refrigerated doughs, and allowed to stand 4 hours at ambient temperatures (ca. 70° F.) to proof. The sealed cans were placed in a freezing atmosphere of −20° F. for 4 hours, at which time the dough was frozen, then transferred directly to refrigerated storage at 40° F. Cans of the raw dough were examined after storage at 40° F. for 2, 4, 8 and 12 weeks. Over this period of time not a single crystal of disodium phosphate dodecahydrate could be seen or felt.

Control samples made of the same formulation and by the same method, but which were not frozen prior to refrigerated storage, contained visible disodium dodecahydrate crystals as early as the fourth week of storage at 40° F.

*Example 2*

A dough was made with the same formula using the same procedure as that described under Example 1, except that the hexagonal dough pieces were frozen at −20° F. for 1 hour prior to packaging. The frozen pieces of dough were packed in cans suitable for refrigerated doughs, then allowed to proof at ambient room temperatures for 4 hours before storage at 40° F. Examination of doughs after 14 weeks storage showed that the incidence of visible crystal formation was reduced drastically over samples with no freezing treatment whatever.

It will be understood that it is intended to cover all changes and modifications of the examples of the invention herein chosen for the purpose of illustration which do not constitute departures from the spirit and scope of the invention.

We claim:

1. The method of preventing the formation of visible crystals of disodium phosphate dodecahydrate in canned cereal doughs for refrigerated storage and subsequent baking containing phosphate leavening acids, comprising cooling the dough to at least its freezing point prior to storage at refrigeration temperatures above 32° F.

2. The method of preventing the formation of visible crystals of disodium phosphate dodecahydrate in cereal doughs for refrigerated storage and subsequent baking containing phosphate leavening acids, comprising proofing the dough and subsequently cooling the dough to at least its freezing point, and subsequently storing the dough in containers at a temperature of 40° to 50° F.

3. The method of preventing the formation of visible crystals of disodium phosphate dodecahydrate in canned cereal doughs for refrigerated storage and subsequent baking containing phosphate leavening acids, comprising cooling the dough to at least its freezing point, thawing the dough, and proofing the dough.

References Cited in the file of this patent
UNITED STATES PATENTS

| 2,478,618 | Armstrong et al. | Aug. 9, 1949 |
| 2,810,650 | Joslin | Oct. 22, 1957 |
| 2,942,988 | Erekson | June 28, 1960 |